United States Patent [19]

Aoyama et al.

[11] Patent Number: 5,342,662
[45] Date of Patent: Aug. 30, 1994

[54] MULTILAYERED CONTAINER

[75] Inventors: Akimasa Aoyama; Tetsuya Katayama; Takeshi Moritani; Junnosuke Yamauchi; Satoshi Hirofuji, all of Kurashiki, Japan

[73] Assignee: Kuraray Co., Ltd., Kurashiki, Japan

[21] Appl. No.: 977,104

[22] Filed: Nov. 16, 1992

Related U.S. Application Data

[62] Division of Ser. No. 486,560, Feb. 27, 1990, Pat. No. 5,194,474.

[30] Foreign Application Priority Data

Mar. 8, 1989 [JP] Japan .................................. 1-57581

[51] Int. Cl.⁵ .................................................. B29D 22/00
[52] U.S. Cl. .................................... 428/34.8; 428/35.4; 428/36.7; 428/412; 428/476.3; 428/478.8; 428/481; 428/483; 428/511; 428/514; 428/516; 428/520
[58] Field of Search ............ 428/34.8, 35.4, 36.7, 428/412, 478.8, 476.3, 481, 483, 51.1, 514, 516, 520

[56] References Cited

U.S. PATENT DOCUMENTS

| | | | |
|---|---|---|---|
| 3,328,498 | 6/1967 | Cheney | 264/152 |
| 4,026,458 | 5/1977 | Morris et al. | 229/30 |
| 4,070,429 | 1/1978 | Uhlig | 264/189 |
| 4,337,116 | 6/1982 | Foster et al. | 156/285 |
| 4,367,305 | 1/1983 | Satoh et al. | 524/398 |
| 4,515,648 | 5/1985 | Kolbe et al. | 156/251 |
| 4,582,664 | 4/1986 | Clark | 264/159 |
| 4,662,978 | 5/1987 | Oki | 156/530 |
| 4,701,360 | 10/1987 | Gibbons et al. | 428/35 |
| 4,767,482 | 8/1988 | Diez et al. | 156/251 |
| 4,796,766 | 1/1989 | Clark | 264/536 |
| 4,824,504 | 4/1989 | Kagata | 264/511 |
| 4,844,330 | 7/1989 | Roosa et al. | 229/120.06 |
| 4,904,723 | 2/1990 | Uemura et al. | 524/394 |
| 4,931,500 | 6/1990 | Okamoto et al. | 525/60 |

FOREIGN PATENT DOCUMENTS

| | | | |
|---|---|---|---|
| 1250104 | 9/1967 | Fed. Rep. of Germany | 264/536 |
| 52-955 | 6/1975 | Japan . | |
| 51-49294 | 4/1976 | Japan . | |
| 178724 | 11/1982 | Japan | 264/516 |
| 39535 | 3/1984 | Japan | 264/516 |
| 62-143954 | 6/1987 | Japan . | |

*Primary Examiner*—Judy M. Reddick
*Attorney, Agent, or Firm*—Kramer, Brufsky, Cifelli

[57] ABSTRACT

Provided are compositions comprising a saponified product of an ethylene-vinyl acetate copolymer having an ethylene content of 20 to 80 mol % and a saponification degree of vinyl acetate component of at least 95 mol %, said composition containing 20 to 200 ppm as converted to alkali metal of an alkali metal acetate, 30 to 250 ppm of acetic acid, and 5 to 500 ppm as converted to phosphate ion of phosphoric acid or an alkali metal hydrogenphosphate, and having a content ratio of acetic acid/alkali metal acetate of 0.1 to 1 and the flow characteristic that the extrusion rate does not substantially increase for at least 10 hours in the relationship between the heating time and the extrusion rate with a capillary rheometer (Koka Flow Tester) at at least one temperature 10° to 80° C. above the melting point.

Also provided are multilayered containers comprising as the innermost layer a layer formed by the use of the above composition, and packages comprising such containers containing a liquid article or paste article.

5 Claims, No Drawings

MULTILAYERED CONTAINER

This application is a division of application Ser. No. 07/486,560, filed Feb. 27, 1990 and now U.S. Pat. No. 5,194,474.

BACKGROUND OF THE INVENTION

1. FIELD OF THE INVENTION

The present invention relates to compositions which generate little odorous components and are excellent thermal stability, to multilayered containers which can pack and contain various foods, in particular various liquid foods and beverages, e.g. straight juices of citrus fruits, such as orange juice and lemon juice, as well as cosmetics, perfumes, etc., without impairing their good flavor and/or good odor, and further to packages, particularly food packages, comprising such containers containing various contents, with high quality and excellent keeping property.

2. DESCRIPTION OF THE PRIOR ART

Recently, as containers for liquid foods and the like, besides conventional glass bottles and metal cans, multi-layered structures comprising thermoplastic resins and composite containers comprising paper and thermoplastic resin layers have been widely used.

In keeping with this movement, there has been a problem of deterioration of the contents, especially of foods. Particularly, when the contents are juices of citrus fruits or foods containing such fruits, terpene hydrocarbons such as d-limonene which constitute the flavor component tend to be absorbed in polyolefins such as polyethylene, which are widely used for the innermost layer of such containers. The reduction of the flavor components of a food during its storage necessarily leads to deterioration of the flavor, thereby minimizing its commercial value.

In the case where a saponified product of an ethylene-vinyl acetate copolymer (hereinafter referred to as EVOH) is used instead of polyolefin resins for the innermost layer, the absorption of the flavor components is, as described in Japanese Patent Application Laid-open No. 3950/1988, markedly reduced and the flavor does hence not deteriorate so much. However, conventional EVOH has still the following problem. Containers comprising conventional EVOH often produce an irritating odor due to isolation of residual acetic acid, or produce acetaldehyde, crotonaldehyde, aldol or the like as its pyrolysate, so that the containers cannot exhibit a sufficient preservability for food flavors. Even when the contents are good-smelling cosmetics or perfumes, which are non-foods, their odors deteriorate from the same reason, which is not preferred.

Japanese Patent Application Laid-open Nos. 955/1977, 49294/1976 and 143954/1987 disclose the incorporation into EVOH of metal salts and acetic acid for the purpose of providing the EVOH with thermal stability. The former two have not been able to succeed in suppressing generation of odorous components because of large incorporation of acetic acid, and the latter does not have sufficient thermal stability because of the use of the specific metal phosphates and further is not given consideration for suppressing generation of odorous components at all. Furthermore, none the above literature describes about the provision of the EVOH composition at the innermost layer of a multi-layered container.

SUMMARY OF THE INVENTION

Accordingly, an object of the present invention is to provide an EVOH composition without the above-mentioned problems, by the use of which the flavor components of liquid foods such as citrus fruit juices, the components for desirable high-quality odors of cosmetics and perfumes, or the like are not absorbed in the container and, at the same time, odorous components deteriorating the flavor of the contained foods or the good odor of the contained cosmetics or the like do not generate from the inner surface of the container body.

Another object of the present invention is to provide a multilayered container comprising such composition as the innermost layer.

Still another object of the present invention is to provide a package comprising such container and its contents, having high quality and excellent storing capability.

The present inventors have found that the following specific EVOH composition generates little odorous components and at the same time has excellent thermal stability. The EVOH has an ethylene content of 20 to 80 mol % and a saponification degree of vinyl acetate component off at least 95 mol %. The composition further contains 20 to 200 ppm as converted to alkali metal of an alkali metal acetate, not more than 10 ppm of metals belonging to the group II of the periodic table, 30 to 250 ppm of acetic acid and 5 to 500 ppm as converted to phosphate ion of phosphoric acid or an alkali metal hydrogenphosphate, has a content ratio of acetic acid/alkali metal acetate of 0.1 to 1 and has the flow characteristic that the extrusion rate does not substantially increase for at least 10 hours in the relationship between the heating time and the extrusion rate with a capillary rheometer (Koka Flow Tester) at at least one temperature 10° to 80° C. above the melting point. The present inventors have also found that the afore-mentioned problems can be solved by multilayered containers comprising a layer of such composition as the innermost layer.

DETAILED DESCRIPTION OF THE PREFERRED EMBODIMENTS

The compositions, in particular EVOH compositions used for the innermost layer of multilayered containers must be ones specified above.

The alkali metal acetate herein is sodium acetate, potassium acetate or lithium acetate, the former two being preferred. It is necessary that the content of the alkali metal acetate be 20 to 200 ppm as converted to the alkali metal. If the content is less than 20 ppm, the EVOH will not give a multilayered structure with neat appearance due to coloring and formation of many gelled matters perhaps because such EVOH readily oxidize upon melt formation. On the other hand, if the contents exceeds 200 ppm, the EVOH will readily decompose thermally at the molding of multi-layered containers, thereby generating odorous components such as acetaldehyde, crotonaldehyde and aldol, which then migrate into the contents such as foods, which is not preferred. The content of the alkali metal salt is more preferably in the range of from 40 to 150 ppm.

The metals belonging to the group II of the periodic table should not necessarily be incorporated. If they be ever incorporated, the content is preferably not more than 10 ppm. Since the metals have markedly larger function to pyrolyze EVOH than alkali metal acetate, a content of such metals exceeding 10 ppm will cause to generate large amounts of the above-mentioned odorous materials, which is not preferred. The metals belonging to group II of the periodic table herein are calcium, magnesium, berilium, zinc and barium, and they are contained in EVOH in the form of compounds such as carbonate and acetate.

It is necessary that the content of acetic acid be 30 to 250 ppm. If the content is less than 30 ppm, the effect of acetic acid to prevent alkali metal acetates or the metals belonging to group II of the periodic table from pyrolyzing EVOH will not fully exhibit, thereby causing the above-mentioned odorous components to generate. On the other hand, if the content exceeds 250 ppm, the acetic acid will migrate to the contents from the innermost layer, i.e. EVOH layer, of the multilayered container and smell irritatingly. The content of acetic acid is more preferably in the range of from 40 to 240 ppm.

It is necessary that the content of phosphoric acid or alkali metal hydrogenphosphates be 5 to 500 ppm as converted to phosphate ion. Examples of the alkali metal hydrogenphosphate of are disodium hydrogenphosphate, sodium dihydrogenphosphate, dipotassium hydrogenphosphate and potassium dihydrogenphosphate, among which sodium dihydrogenphosphate and potassium dihydrogenphosphate are preferably used. If the content of phosphate ion is less than 5 ppm, its effect of preventing alkali metal acetates or the metals belonging to group II of the periodic table from pyrolyzing EVOH will not fully exhibit, thereby causing the above-mentioned odorous components to generate. On the other hand, if the content exceeds 500 ppm, the phosphate ion itself will generate a special odor resulting perhaps from its pyrolysis. The content of phosphate ion is more preferably in the range of from 10 to 350 ppm.

It is necessary that the content ratio of acetic acid to alkali metal acetates be 0.1 to 1. If the ratio is less than 0.1, the EVOH will generate a strong pyrolysis odor even when the contents of acetic acid, alkali metal acetates and phosphate ion are all within the appropriate ranges, i.e. 30 to 250 ppm, 20 to 200 ppm as converted to alkali metals and 5 to 500 ppm, respectively. On the other hand if the ratio exceeds 1, the EVOH will not give a multilayered structure with neat appearance due to coloring and formation of many gelled matters perhaps because such EVOH readily oxidize upon melt formation. The ratio is more preferably in the range of from 0.2 to 0.9.

It is preferred that the content ratio of phosphoric acid or alkali metal hydrogenphosphates to alkali metal acetates be in the range of from 0.02 to 10 and more preferably in the range of from 0.03 to 5.

Here, the contents of the above-mentioned components are those in EVOH composition before molding and not those in the innermost layer after the molding. The above-mentioned contents are all based on weight, and measured according to the following methods.

① Alkali metal acetates

Place 100 parts of EVOH composition in 250 parts of 0.1 N aqueous nitric acid solution. Heat the mixture with stirring at 95° C. for 3 hours, and then filter the mixture. Determine the concentration of alkali metals in the filtrate by ion chromatography. Since all the alkali metals in the EVOH composition has been extracted into the aqueous nitric acid solution during the above heating, the concentration of the alkali metals in the filtrate thus determined gives by calculation the content of the alkali metals in the EVOH composition. Determine the amount of acetate ion of the alkali metal acetates as follows. First determine the total amount of acetate ions, X, from the alkali metal acetates and from acetic acid by ion chromatography. The amount of acetate ion, Y, of acetic acid is determined by method ③. Subtract Y from X to obtain the amount of the acetate ion of the alkali metal acetates.

② Metals belonging to group II of the periodic table

The content of these metals is determined in the same manner as for alkali metal acetates.

③ Acetic acid

Place 100 parts of EVOH composition in 250 parts of deionized water. Heat the mixture with stirring at 95° C. for 3 hours, and then filter the mixture. Titrate the acetic acid in the filtrate with sodium hydroxide. Since all the acetic acid in the EVOH composition has been extracted into the deionized water during the above heating, the concentration of the acetic acid in the filtrate thus determined gives by calculation the content of the acetic acid in the EVOH composition.

④ Phosphoric acid and alkali metal hydrogenphosphate

Determine the amount of phosphate ion and alkali metals in the same manner as in ①.

Besides the above, the EVOH composition according to the present invention must have the flow characteristic that the extrusion rate does not substantially increase for at least 10 hours in the relationship between the heating time and the extrusion rate with a capillary rheometer (Koka Flow Tester) at at least one temperature point 10° to 80° C. above the melting point. In the case of an EVOH with which the extrusion rate starts increasing in 10 hours, the EVOH will tend to generate an intense pyrolysis odor when its melt formation is performed continuously over a long time period. The extrusion rate with Koka Flow Tester herein means the amount extruded per unit time under a load of 10 kg/cm$^2$ through a nozzle having an inner diameter of 1 mm and a length of 10 mm. The expression "does not substantially increase" herein means that, where $V_0$ and $V_{10}$ are the extrusion rate at the beginning (heating time: 0) and that 10 hours after the start of heating respectively, $V_{10}/V_0$ is not more than 1.1, preferably not more than 1.05. $V_{10}/V_0$ is preferably at least 0.05, more preferably at least 0.1.

In the present invention, it is necessary that the ethylene content and saponification degree of vinyl acetate component of EVOH be 20 to 80 mol % and at least 95 mmol %, respectively.

If the ethylene content is less than 20 mol %, the EVOH will readily gel, thereby rendering its melt formation operation difficult to conduct over a long time period. On the other hand, if the ethylene content exceeds 80 mol %, the EVOH will absorb flavor components such as d-limonene to a large extent, thereby deteriorating the taste of the contents. For the purpose of providing a high oxygen barrier property while minimizing the absorption of flavor components, the ethylene content is preferably 25 to 70 mol %, more preferably 25 to 60 mol %.

If the saponification degree is less than 95 mol %, the EVOH will again readily gel and, like the case of low ethylene content, a long-period melt formation operation is difficult to achieve. More preferably, the saponification degree is at least 98 mol %.

While there is no specific restriction as to the melt index (210° C., 2160 g) of the EVOH, it is preferably in the range of from 0.2 to 120 g/10 min, more preferably in the range of from 1.0 to 60 g/10 min.

The EVOH composition as referred to in the present invention may be modified with not more than 5 mol % of a copolymerizable monomer. Examples of the copolymerizable monomer are propylene, 1-butene, 1-hexene, 4-methyl-1-pentene, acrylic acid esters, methacrylic acid esters, maleic acid, fumaric acid, itaconic acid, higher fatty acid vinyl esters, alkyl vinyl ethers, N-vinylpyrrolidone, N-n-butoxymethylacrylamide, vinyltrimethoxysilane, vinylmethyldimethoxysilane, vinyldimethylmethoxysilane, N-(2-dimethylaminoethyl)methacrylamide and quaternary compounds thereof; N-vinylimidazole and quaternary compound thereof; and the like.

The EVOH compositions, particularly those used for the innermost layer of multilayered containers, according to the present invention are produced by for example the following process. Ethylene and vinyl acetate are copolymerized with a known radical polymerization initiator such as $\alpha,\alpha'$-azobis-iso-butyronitrile in the presence or absence of an alcohol such as methanol to give an ethylene-vinyl acetate copolymer. The obtained ethylene-vinyl acetate copolymer is then saponified in the presence of an alkali catalist such as sodium hydroxide or potassium hydroxide. The saponified product, i.e. EVOH, is washed with deionized water or the like which contains little metal ions, chloride ion and the like to remove sodium acetate, potassium acetate or the like which has been formed by the saponification reaction. Here, part of the sodium acetate, potassium acetate or the like may remain unremoved. Next, the EVOH is added with prescribed amounts of acetic acid, an alkali metal acetate such as sodium acetate and a compound containing phosphate ion such as sodium dihydrogenphosphate, and the mixture is dried. Here, these substances may directly be added to the EVOH, or be first dissolved in deionized water or the like which contains little ions, followed by immersion of the EVOH in the thus obtained solution.

Now described is about the multilayered containers comprising the EVOH composition of the present invention as their innermost layer. Examples of the layer construction of the multilayered containers are, where A means a layer of a thermoplastic resin with low water absorbability provided outside the EVOH composition layer, C, and B means an adhesive layer:

(1) 2 layers: C/A
(2) 3 layers: C/B/A, C/B/(A+B), C/B/(A+B+C)
(3) 4 layers: C/B/(A+B+C)/A, C/B/A/(A+B+C)
(4) 5 layers: C/B/A/B/C, C/B/(A+B+C)/B/C
(5) 6 layers: C/B/A/(A+B+C)/B/A, C/B/A/C/B/A
(6) 7 layers: C/B/A/B/C/B/A, C/B/(A+B+C)/B/C/B/A and the like. Further examples where paper is provided outside the EVOH composition layer are: C/A/paper/A, C/A/paper/(A+C), C/B/A/paper/A and the like. Other constructions are also applicable and an aluminum layer may also be provided.

In the above constructions, while the layer C (EVOH composition layer) must constitute the innermost layer, it may also constitute, additionally, other layers, which case will give containers having still higher keeping property. The innermost layer herein means a layer which directly contact the contents when a liquid article or paste article is packed.

Examples of the thermoplastic resin with low water absorbability are polyolefins such as polyethylene (low density, medium density or high density), polypropylene and ethylene-propylene copolymer, ethylene-vinyl acetate copolymer, thermoplastic polyesters, polyamides, polystyrene, polycarbonates, polyvinyl chloride, acrylic resins such as polyacrylonitrile, polyacetals and mixtures of the foregoing, among which particularly preferred are polyethylene, polypropylene, ethylene-propylene copolymer and mixtures of them.

Various adhesive resins can be used for the adhesive layer, B, and they are selected depending on the kind of the resin to be bonded to the EVOH composition layer. Representative adhesives which provide particularly firm bond to the EVOH composition of the present invention are carboxyl-containing modified olefin polymers obtained by chemically bonding (by addition, grafting or the like) an unsaturated carboxylic acid or its anhydride to olefin polymers, e.g. polyolefins such as low-density polyethylene, high-density polyethylene, linear low-density polyethylene, polypropylene and polybutene, copolymers of an olefin with a comonomer copolymerizable with the olefin (for example, vinyl esters, unsaturated carboxylic acid esters) such as ethylene-vinyl acetate copolymer and ethylene-ethyl ester copolymer. Preferred examples of such carboxyl-containing modified olefin are polyethylene modified by grafting of maleic anhydride, polypropylene modified by grafting of maleic anhydride, ethylene-ethyl acrylate copolymer modified by grafting of maleic anhydride, ethylene-vinyl acetate copolymer modified by grafting of maleic anhydride and mixtures of the foregoing. These adhesive resins may be blended with an EVOH, for example with the afore-mentioned EVOH composition.

In the present invention, the above-mentioned layer C (EVOH composition layer) may optionally incorporate or, sometimes, preferably incorporate the above-mentioned thermoplastic resin (A) with low water absorbability and/or adhesive resin (B). For example, where the container of the present invention is to be boil sterilized or retort sterilized, the innermost layer (C) can be prevented from being mal-formed by incorporation thereinto of at least one member selected from the group consisting of a polyolefin, a thermoplastic polyester, a polyamide and a polycarbonate, the incorporation ratio based on the total weight of the EVOH composition (C) and the thermoplastic resin (A) having low water absorbability being preferably at least 3 wt %, more preferably at least 5 wt %, most preferably at least 15 wt % and preferably not more than 97 wt %, more preferably not more than 45 wt %, most preferably not more than 35 wt %.

According to the present invention, parisons, sheets or films having the above multilayered construction are formed by coextrusion, lamination or like processes and the parisons, sheets or films thus formed are then formed into bottles, cups, pauches, tubes and the like by known processes.

Formation processes for typical multilayered containers are now described more concretely.

Preparation of bottles is first described, since in the present invention particularly significant effect is produced when the multilayered container is a bottle.

Bottles are produced by a process which comprises obtaining multilayered hot parisons by coextrusion and then directly blowing the hot parisons into bottles, or a process which comprises obtaining multilayered cold parisons with a bottom, pipes) by coextrusion or coinjection then biaxially stretch-blowing the cold parisons into bottles. Where the direct blow molding is used, hot parisons are partly bitten off by the pinch-off of the mold used in the blow molding, whereby two portions of the EVOH in the innermost layer join with each other and, at the same time, the adhesive layer neighboring the EVOH layer becomes thin at the pinch-off part, of all the bottles formed. As a result, where conventional EVOH is used, the adhesiveness to the adhesive layer often becomes low and the pinch-off part will hence often be of very low strength. On the contrary, bottles using the EVOH composition of the present invention not only prevent odorous components from generating, but have sufficient strength for the practical purpose even at their pinch-off part.

Preparation of cups is next described. Sheetings of the above-described resin layers are formed by T-die process, tubular film formation or the like. The sheetings are then formed by plug-assist molding, drawing by using die and punch, pressure formation, drawing with ironing or like processes into non-joint, cup-shaped multilayered drawn containers having a construction of for example the afore-mentioned C/B/A/C/B/A with the layer C (EVOH layer) at least as the innermost layer.

Lastly, preparation of multilayered containers comprising a paper layer is described with an example of the above-mentioned construction of C/A/paper/A. Both sides of a paperboard is flame treated, and then for example a low-density polyethylene layer each is extrusion laminated on each side to form layer A. Next, the surface of the layer A (low-density polyethylene layer) of the layer-C side is corona discharged, followed by extrusion lamination or dry lamination thereon of the EVOH layer to form the layer C. The multilayered structure thus formed is molded, with the layer C being the innermost layer, into containers having a rectangular parallelepiped or like shapes.

The multilayered containers of the present invention are useful for various beverages and liquid foods, examples being:

Fruit juices
 Straight juices: orange juice, lemon juices, plum juice, grape juice, strawberry juice, etc.
 Processed fruit juices: nectar, etc.
Green juices: vegetable juices, tomato juice, etc.
Synthetic beverages
Those containing synthetic fruit juices utilizing citric acid, colorants, perfumes, saccharides such as sugar arid fructose, and vitamins as required.
Lactic acid beverages
Cooked curry
Stews: stewed bear, etc.
Soups: consomme, potage, miso-soup, etc.
Refreshments: "Zenzai" (thick bean-meal soup with sugar and rice cake), boiled adzuki-bean, "Shiruko" (adzuki-bean soup with sugar and rice cake), "Anmitsu" (boiled peas with honey and bean-jam), "Mitsu-mame" (boiled beans, agar-agar cubes and other delicacies with treacle poured on), jelly, etc.
Processed sea foods and livestock products bacon, boiled fish paste, hamburgers, sausage, ham, etc.
Fruits: orange, pineapple, cherry, etc.
Condiments: soybean sauce, sauce, vinegar, dressings, catsups, mayonnaise, edible oil, miso, etc.
Bread auxiliaries: margarine, butter, jam, etc.
Alcoholic beverages: beer, sake, whisky, wines, cocktails such as gin fizz.

Furthermore, the containers of the present invention can be suitably used for containing medicines such as Ringer's solution, agricultural chemicals, cosmetics, washing agents and the like.

The containers of the present invention are particularly suited for, among the above-mentioned items, containing citrus fruit juices or carbonated water containing them.

Packages of liquid foods, cosmetics, perfumes or the like contained in the containers of the present invention are very valuable, since they have high qualities and good storage capability.

Other features of the invention will become apparent in the course of the following descriptions of exemplary embodiments which are given for illustration of the invention and are not intended to be limiting thereof. In the Examples, "parts" and "%" are based on weight unless otherwise specified.

EXAMPLES

Example 1

Methanol vapor was blown into a solution comprising 45 parts of an ethylene-vinyl acetate copolymer having an ethylene content of 28 mol %, 50 parts of methanol and 1 part of sodium hydroxide at 110° C. and under a pressure of 3.5 kg/cm$^2$G for 40 minutes to effect saponification reaction, while methyl acetate generating during the reaction was distilled off with part of methanol and removed from the system. The thus obtained reaction mixture (saponification degree of vinyl acetate component: 99.3 mol %) was extruded through a die having a diameter of 2 mm into a solution industrial water/methanol (weight ratio: 90/10) to be coagulated therein into a strand, which was then cut with a cutter to pellets. The industrial water used contained 9.4 ppm of calcium ion and 1.2 ppm of magnesium ion. One part of the pellets was washed 3 times with an aqueous solution containing 0.01 part acetic acid dissolved in 100 parts deionized water. Next, the washed pellets were immersed 3 hours in an aqueous solution of 0.03 part acetic acid, 0.02 part potassium acetate and 0.005 part sodium dihydrogen phosphate dissolved in 100 parts deionized water, squeezed and then dried. The EVOH pellets after being dried contained 140 ppm of potassium acetate as converted to potassium, 150 ppm of acetic acid, 45 ppm of sodium dihydrogenphosphate as converted to phosphoate ion, 3 ppm calcium and not more than 1 ppm of metals belonging to group II of the periodic table except calcium. The EVOH showed a content ratio of acetic acid/potassium acetate of 0.4, and had a moisture content of 0.1%, MI (210° C., 2160 g) of 3.5 g/10 min and a melting point of 190° C. The extrusion rate of the EVOH through a Koka Flow Tester (type 301, made by Shimazu Corporation) at 220° C. did not substantially increase over more than 10 hours ($V_{10}/V_0=0.10$). The extrusion rate with Koka Flow Tester herein means the amount extruded per unit time under a load of 10 kg/cm$^2$ through a nozzle having an inner diameter of 1 mm and a length of 10 mm.

The EVOH composition thus obtained was used in the formation of bottles having a construction of EVOH/adhesive resin/EVOH/adhesive resin/high-density polyethylene, in which the EVOH was provided as the innermost layer and as the intermediate layer, through a 3 kind/5 layer direct blow molding machine at a die temperature of 240° C. As the adhesive resin, a maleic anhydride-modified ethylene-vinyl acetate copolymer having an MI (190° C., 2160 g) of 1.8 g/10 min, a maleic anhydride content of 0.5% and vinyl acetate content of 20%. The high-density polyethylene used was one having an MI (190° C., 2160 g) of 1.0 g/10 min and a density of 0.945 g/cm$^3$. Thus prepared were bottles of 2-liter capacity fitted with a handle and having a thickness (body) construction of 45/27/30/21/280 in μm in the order listed above.

The bottles were each aseptically filled with 1.8 l of a condensed reduced 100% orange juice, and the packages were stored at 5° C. for 8 weeks. After the storage, the orange juice contained was tested for the content of d-limonene and by organoleptic test for flavor and taste by 5 panelists. The results are shown in Table 1. The content of d-limonene was determined by head-space gas chromatography. The ratings for flavor and taste were, based on those of fresh orange juice, as follows:

A: same as the flavor or taste of fresh orange juice
B: a little different from the flavor or taste of fresh orange juice but not unpleasant.
C: different from the flavor or taste of fresh orange juice and unpleasant.

For the purpose of testing the bottle strength, 20 bottles containing orange juice were dropped from the height of 2 m, but none of them were broken.

Example 2

Procedures similar to those described in Example 1 were followed to prepare an EVOH composition containing acetic acid, sodium acetate and phosphoric acid and an EVOH having an ethylene content of 38 mol %, saponification degree of 99.5 mol %, an MI (270° C., 2160 g) of 3.3 g/10 min and a melting point of 176° C. The EVOH composition obtained contained 100 ppm of sodium acetate as converted to sodium 230 ppm of acetic acid, 15 ppm of phosphoric acid as converted to phosphate ion, 5 ppm of calcium and not more than 1 ppm of metals belonging to group II of the periodic table except calcium. The EVOH composition showed a contempt ratio of acetic acid/sodium acetate of 0.65, and had a moisture content of 0.1%. The extrusion rate of the EVOH composition through a Koka-type flow tester at 220° C. did not substantially increase over more than 10 hours ($V_{10}/V_0=0.33$).

The EVOH pellets obtained were formed into bottles in the same manner as in Example 1, and the bottles were subjected to test for storing capability with orange juice. The results are also shown in Table 1. The bottles were also tested for strength by dropping test in the same manner as in Example 1 and none of them were broken.

Example 3

Procedures similar to those described in Example 1 were followed to prepare an EVOH composition containing acetic acid, sodium acetate and potassium dihydrogenphosphate and an EVOH having an ethylene content of 44 mol %, saponification degree of 99.1 mol %, an MI (210° C, 2160 g) of 8.2 g/10 min and a melting point of 163° C. The EVOH composition obtained contained 50 ppm of sodium acetate as converted to sodium, 50 ppm of acetic acid, 300 ppm of potassium dihydrogenphosphate as converted to phosphate ion, 5 ppm of calcium and not more than 1 ppm of metals belonging to group II of the periodic table except calcium. The EVOH composition showed a content ratio of acetic acid/sodium acetate of 0.28, and had a moisture content of 0.22%. The extrusion rate of the EVOH through a Koka Flow Tester at 220° C. did not substantially increase over more than 10 hours ($V_{10}/V_0=0.42$).

The EVOH pellets were formed into bottles in the same manner as in Example 1, and the bottles were tested for storing capability with orange juice. The results are also shown in Table 1. The bottles were also tested for strength by dropping test in the same manner as in Example 1 and none of them were broken.

Example 4

Procedures similar to those described in Example 1 were followed to prepare an EVOH composition containing acetic acid, sodium acetate and sodium dihydrogenphosphate and an EVOH having an ethylene content of 55 mol %, a vinyltrimethoxysilane content of 0.015 mol %, a saponification degree of 98.4 mol %, an MI (210° C., 2160 g) of 9.4 g/10 min and a melting point of 145° C. The EVOH composition obtained contained 80 ppm of sodium acetate as converted to sodium, 70 ppm of acetic acid, 30 ppm of sodium dihydrogenphosphate as converted to phosphate ion, 3 ppm of calcium and not more than 1 ppm of metals belonging to group II of the periodic table except calcium. The EVOH composition showed a content ratio of acetic acid/sodium acetate of 0.25, and had a moisture content of 0.11%. The extrusion rate of the EVOH through a Koka Flow Tester at 200° C. did not substantially increase over more than 10 hours ($V_{10}/V_0=0.54$).

The EVOH pellets were formed into bottles in the same manner as in Example 1, and the bottles were tested for storing capability with orange juice. The results are also shown in Table 1. The bottles were also tested for strength by dropping test in the same manner as in Example 1 and none of them were broken.

Comparative Example 1

Bottles were formed in the same manner as in Example 1 except for using as the innermost layer high-density polyethylene instead of the EVOH composition described in Example 1. The bottles had a construction of (inner) high-density polyethylene/adhesive resin-/EVOH/adhesive resin/high-density polyethylene (outer) with the thicknesses being 50/21/45/21/280 (μm). The bottles were tested for storing capability with orange juice. The results are also shown in Table 1. The content of d-limonene markedly decreased and the taste worsened to a great extent.

Comparative Example 2

Procedures similar to those described in Example 1 were followed to prepare an EVOH composition containing acetic acid, sodium acetate and calcium hydrogenphosphate and an EVOH having an ethylene content of 38 mol %, a saponification degree of 99.5 mol %, an MI (210° C., 2160 g) of 3.4 g/10 min and a melting point of 176° C. The EVOH composition obtained contained 110 ppm of sodium acetate as converted to sodium, 50 ppm of acetic acid, 70 ppm of calcium hydrogenphosphate as converted to phosphate ion, 20 ppm of calcium and not more than 1 ppm of metals belonging to group II of the periodic table except calcium. The EVOH composition showed a content ratio of acetic acid/sodium acetate of 0.13, and had a moisture content of 0.1%. The extrusion rate of the EVOH through a Koka Flow Tester at 220° C. first decreased with time for 5 hours, then gradually increased and 8 hours after the start became as high as 4 times that at the start.

The EVOH pellets were formed into bottles in the same manner as in Example 1, and the bottles were tested for storing capability with orange juice. The results are also shown in Table 1. The bottles generated, just after being formed, an intense burning odor which was thought to come from pyrolysis of the EVOH. The test of tile gas contained in the bottle indicated the presence of acetaldehyde, crotonaldehyde, aldol and the like, which were not observed in Examples 1 through 4.

Comparative Example 3

Procedures similar to those described in Example 1 were followed to prepare an EVOH composition containing acetic acid, sodium acetate and potassium dihydrogenphosphate and an EVOH having an ethylene content of 38 mol %, a saponification degree of 99.5 mol %, an MI (210° C., 2160 g) of 3.4 g/10 min and a melting point of 176° C. The EVOH composition obtained contained 150 ppm of sodium acetate as converted to sodium, 40 ppm of acetic acid, 70 ppm of potassium dihydrogenphosphate as converted to phosphate ion, 8 ppm of calcium and not more than 1 ppm of metals belonging to group II off the periodic table except calcium. The EVOH showed a content ratio of acetic acid/sodium acetate of 0.07, and had a moisture content of 0.1%. The extrusion rate of the EVOH through a Koka Flow Tester at 220° C. first decreased with time for 8 hours, but then increased upto 1.9 times that at the start after 10 hours after the start ($V_{10}/V_0=1.9$).

The EVOH pellets were formed into bottles in the same manner as in Example 1, and the bottles were tested for storing capability with orange juice. The results are also shown in Table 1. The bottles generated, just after being formed, an intense burning odor which was thought to come from pyrolysis of the EVOH. The test of the gas contained in the bottle indicated, same as in Comparative Example 2, the presence of acetaldehyde, crotonaldehyde, aldol and the like.

Comparative Example 4

Procedures similar to those described in Example 1 were followed to prepare an EVOH composition containing acetic acid, sodium acetate and potassium dihydrogenphosphate and an EVOH having an ethylene content of 38 mol %, a saponification degree of 99.5 mol %, an MI (210° C, 2160 g) of 3.3 g/10 min and a melting point of 176° C. The EVOH composition obtained contained 50 ppm of sodium acetate as converted to sodium, 350 ppm of acetic acid, 15 ppm of potassium dihydrogenphosphate as converted to phosphate ion, 5 ppm of calcium and not more than 1 ppm of metals belonging to group II of the periodic table except calcium. The EVOH composition showed a content ratio of acetic acid/sodium acetate of 2.0 and had a moisture content of 0.15%. The extrusion rate of the EVOH through a Koka Flow Tester at 220° C. did not substantially increased over 10 hours ($V_{10}/V_0=0.27$).

The EVOH pellets were formed into bottles in the same manner as in Example 1, and the bottles were tested for storing capability with orange juice. The results are also shown in Table 1. The bottles generated, just after being formed, an intense acetic acid odor.

Comparative Example 5

Procedures similar to those described in Example 1 were followed to prepare an EVOH composition containing acetic acid, sodium acetate and potassium dihydrogenphosphate and an EVOH having an ethylene content of 44 mol %, a saponification degree of 99.1mol %, an MI (210° C., 2160 g) of 8.1 g/10 min and a melting point of 163° C. The EVOH composition obtained contained 60 ppm of sodium acetate as converted to sodium, 100 ppm of acetic acid, 550 ppm of potassium dihydrogenphosphate as converted to phosphate ion, 8 ppm of calcium and not more than 1 ppm of metals belonging to group II of the periodic table except calcium. The EVOH composition showed a content ratio of acetic acid/sodium acetate of 0.47, and had a moisture content of 0.1%. The extrusion rate of the EVOH through a Koka Flow Tester at 200° C. did not substantially increase over 10 hours ($V_{10}/V_0=0.41$).

The EVOH pellets were formed into bottles in the same manner as in Example 1, and the bottles were tested for storing capability with orange juice. The results are also shown in Table 1. The bottles generated, just after being formed, an intense peculiar odor.

Comparative Example 6

Example 1 was repeated except for changing the amount of sodium hydroxide to 0.7 to prepare an EVOH composition. The EVOH composition had a saponification degree of 94.3 mol %, and contained 140 ppm of potassium acetate as converted to potassium, 150 ppm of acetic acid, 45 ppm of potassium dihydrogenphosphate as converted to phosphate ion, 8 ppm of calcium and not more than 1 ppm of metals belonging to group II of the periodic table except calcium. The EVOH composition showed a content ratio of acetic acid/sodium acetate of 0.57, and had a moisture content of 0.15%. The EVOH composition had an MI (210° C., 2160 g) of 3.7 g/10 min and a melting point of 190° C. The extrusion rate of the EVOH through a Koka Flow Tester at 220° C. did not substantially increased over 10 hours ($V_{10}/V_0=0.02$).

An attempt was made to form the thus obtained EVOH composition into bottles in the same manner as in Example 1, but bottles with neat appearance and high commercial value could not be obtained because the EVOH readily gelled.

Comparative Example 7

Procedures similar to those described in Example 1 were followed to prepare an EVOH composition containing acetic acid, sodium acetate and potassium dihydrogenphosphate and an EVOH having an ethylene content of 18 mol %, a saponification degree of 99.8 mol %, an MI (230° C., 2160 g) of 6.2 g/10 min and a melting point of 205° C. The EVOH composition obtained contained 120 ppm of sodium acetate as converted to sodium, 110 ppm of acetic acid, 80 ppm of potassium dihydrogenphosphate as converted to phosphate ion, 4 ppm of calcium and not more than 1 ppm of metals belonging to group II of the periodic table except calcium. The EVOH composition showed a content ratio of acetic acid/sodium acetate of 0.26, and had a moisture content of 0.13%. The extrusion rate of the EVOH composition through a Koka Flow Tester at 230° C. did not substantially increased over 10 hours ($V_{10}/V_0=0.01$).

An attempt was made to form the thus obtained EVOH composition into bottles in the same manner as in Example 1, but bottles with neat appearance and high commercial value could not, like in Comparative Example 6, be obtained because the EVOH readily gelled.

Comparative Example 8

Procedures similar to those described in Example 1 were followed to prepare an EVOH composition containing acetic acid, sodium acetate and potassium dihydrogenphosphate and an EVOH having an ethylene content of 38 mol %, a saponification degree of 99.5 mol %, an MI (210° C. 2160 g) of 3.3 g/10 min and a melting point of 176° C. The EVOH composition obtained contained 10 ppm of sodium acetate as converted to sodium, 35 ppm of acetic acid, 20 ppm of potassium dihydrogenphosphate as converted to phosphate ion, 5 ppm of calcium and not more than 1 ppm of metals belonging to group II of the periodic table except calcium. The EVOH composition showed a content ratio of acetic acid/sodium acetate of 0.9 and had a moisture content of 0.17%. The extrusion rate of the EVOH through a Koka Flow Tester at 220° C. did not substantially increased over 10 hours ($V_{10}/V_0=0.30$).

Bottles were formed in the same manner as in Example 1 from the EVOH pellets thus obtained. The bottles were filled with orange juice and then subjected to the dropping test. Of the 20 bottles tested, 15 were broken and the breakage ratio was 75%. They broke at the pinch-off part, more specifically the handle part, which fact indicates low adhesiveness between the EVOH composition layer and the adhesive resin layer.

EXAMPLE 5

A multilayered container having a construction of EVOH/low-density polyesthylene/paperboard/low-density polyethylene was formed with the EVOH composition obtained in Example 3 used for the innermost layer, in the following manner. Both sides of a paperboard having a thickness of 500 μm were flame treated, and then a low-density polyethylene having an MI (190° C., 2160 g) of 0.7 g/10 min and a density of 0.92 g/cm³ (hereinafter referred to as LDPE) was extrusion laminated on one side of the paperboard to form an LDPE layer of 38 μm thickness. Next, the LDPE was extrusion laminated on the other side of the paperboard t:o form an LDPE layer of 16 μm thickness. The surface off the LDPE layer of 16 μm thickness was corona discharged, followed by extrusion lamination thereon of the EVOH composition obtained in Example 3 thereon to form the EVOH composition layer of 20 μm thickness. The multilayered structure thus formed was cut, folded and heatsealed at the closing part to give a rectangular parallelepiped container of 1-liter capacity. The container thus formed was filled with 0.9 liter of 100% lemon juice, and the package was stored at 5° C. for 6 weeks. After the storage, the lemon juice contained was tested for the content of d-limonene and by organoleptic test for flavor and taste by 5 panelists. The results are shown in Table 2. The content of d-limonene was determined, in the same manner as in Example 1, by headspace gas chromatography. The ratings for flavor and taste were, based on those of fresh lemon juice, as follows:

A: same as the, flavor or taste of fresh lemon juice
B: a little different from the flavor or taste of fresh lemon juice but not unpleasant.
C: different from the flavor or taste of fresh lemon juice and unpleasant

EXAMPLE 6

Procedures similar to those described in Example 1 were followed to prepare an EVOH composition containing acetic acid, potassium acetate and sodium dihydrogenphosphate and an EVOH having an ethylene content of 70 mol %, a saponification degree of 98.1 mol %, an MI (210° C., 2160 g) of 80 g/10 min and a melting point of 125° C. The EVOH composition obtained contained 80 ppm of potassium acetate as converted to potassium, 130 ppm of acetic acid, 120 ppm of sodium dihydrogenphosphate as converted to phosphate ion, 6 ppm of calcium and not more than 1 ppm of metals belonging to group II of the periodic table except calcium. The EVOH composition showed a content ratio of acetic acid/potassium acetate of 0.65, and had a moisture content of 0.05%. The extrusion rate of the EVOH through a Koka Flow Tester at 50° C. did not substantially increase over 10 hours ($V_{10}/V_0=0.71$).

The EVOH pellets thus obtained were formed into the same multilayered container as that described in Example 5 in the same manner as in Example 5. The container thus formed was tested for storing capability for lemon juice. The results are also shown in Table 2.

Comparative Example 9

Example 5 was repeated to form the same multilayered container except that a commercial EVOH composition was used instead of the EVOH composition used in Example 5. The commercial EVOH contained 450 ppm of sodium acetate as converted to sodium, 10 ppm of acetic acid, 0 ppm of phosphate ion, 6 ppm of calcium and not more than 1 ppm of metals belonging to group II of the periodic table except calcium. The EVOH showed a content ratio of acetic acid/sodium acetate of 0,065, and had a moisture content of 0.15%, an ethylene content of 40 mol %, a saponification degree of 99.3 mol % and an MI (270° C., 2160 g) of 10 g/10 min. The container formed was tested for storing capability for lemon juice. The results are also shown in Table 2. A strong burning odor was noticed with the container.

Comparative Example 10

Example 5 was repeated to form the same multilayered container except that a commercial EVOH composition having an ethylene content of 88.8 mol %, a saponification degree of 97.3 mol %, and an MI (210° C., 2160 g) of 18 g/10 min was used instead of the EVOH composition used in Example 5. The container formed was tested for storing capability for lemon juice. The results are also shown in Table 2.

Obviously, numerous modifications and variations of the present invention are possible in light of the above teachings. It is therefore to be understood that within the scope of the appended claims, the invention may be practiced otherwise than as specifically described herein.

TABLE 1

|  | d-Limonene (volume %) | Organoleptic test | |
| --- | --- | --- | --- |
|  |  | flavor | taste |
| Example 1 | 0.58 | A | A |
| Example 2 | 0.59 | A | A |
| Example 3 | 0.56 | A | A |
| Example 4 | 0.55 | A | A |

TABLE 1-continued

|  | d-Limonene (volume %) | Organoleptic test flavor | taste |
|---|---|---|---|
| Comp. Ex. 1 | 0.18 | C | C |
| Comp. Ex. 2 | 0.58 | C | C |
| Comp. Ex. 3 | 0.56 | B | C |
| Comp. Ex. 4 | 0.58 | C | B |
| Comp. Ex. 5 | 0.57 | C | C |

Note 1: The content of d-limonene in the fresh orange juice was 0.61 vol %.
Note 2: The ratings for flavor and taste were, based on those of fresh juice, as follows:
A: same as the flavor or taste of fresh orange juice
B: a little different from the flavor or taste of fresh orange juice but not unpleasant.
C: different from the flavor or taste of fresh orange juice and unpleasant.

TABLE 2

|  | d-Limonene (volume %) | Organoleptic test flavor | taste |
|---|---|---|---|
| Example 5 | 0.83 | A | A |
| Example 6 | 0.78 | A | A |
| Comp. Ex. 9 | 0.79 | B | C |
| Comp. Ex. 10 | 0.35 | C | C |

Note 1: The content of d-limonene in the fresh lemon juice was 0.85 vol %.
Note 2: The ratings for flavor and taste were, based on those of fresh lemon juice, as follows:
A: same as the flavor or taste of fresh lemon juice
B: a little different from the flavor or taste of fresh lemon juice but not unpleasant.
C: different from the flavor or taste of fresh lemon juice and unpleasant.

What is claimed is:

1. A multilayered container having a layer formed from a composition comprising a saponified product of an ethylene-vinyl acetate copolymer having an ethylene content of 20 to 80 mol % and a saponification degree of vinyl acetate component of at least 95 mol %, said composition containing 20 to 200 ppm of an alkali metal acetate, as converted to alkali metal, not more than 10 ppm of alkaline earth metals, 30 to 250 ppm of acetic acid, and 5 to 500 ppm as converted to phosphate ion of phosphoric acid or an alkali metal hydrogenphosphate, and having a content ratio of acetic acid/alkali metal acetate of 0.1 to 1 and the flow characteristic that the extrusion rate does not substantially increase for at least 10 hours in the relationship between the heating time and the extrusion rate with a capillary rheometer (Koka Flow Tester) at at least one temperature 10° to 80° C. above the melting point.

2. The multilayered container of claim 1 comprising at least 2 layers wherein a layer of a thermoplastic resin selected from the group consisting of polyolefins, ethylene-vinyl acetate copolymer, polyesters, polyamides, polystyrene, polycarbonates, polyvinyl chloride, acrylic resins, polyacetals, and mixtures thereof, constitutes an outer layer.

3. The multilayered container of claim 1 comprising at least 3 layers wherein a layer of a thermoplastic resin selected from the group consisting of polyolefins, ethylene-vinyl acetate copolymer, polyesters, polyamides, polystyrene, polycarbonates, polyvinyl chloride, acrylic resins, polyacetals, and mixtures thereof, and a paper layer constitute outer layers.

4. The multilayered container of claim 2 wherein said thermoplastic resin is at least one member selected from the group consisting of polyethylene, polypropylene, ethylene-propylene copolymer, ethylene-vinyl acetate copolymer, polyesters, polyamides, polystyrene and polycarbonates.

5. The multilayered container of claim 3 wherein said thermoplastic resin is at least one member selected from the group consisting of polyethylene, polypropylene, ethylene-propylene copolymer and ethylene-vinyl acetate copolymer.

* * * * *